United States Patent [19]
Raubenheimer et al.

[11] Patent Number: 5,059,970
[45] Date of Patent: Oct. 22, 1991

[54] NAVIGATIONAL AID

[75] Inventors: Dennis A. Raubenheimer; Dan C. Cawood; Geoffrey J. Rawlings; Etienne Rijkheer, all of Johannesburg; Anthony D. B. Holderness, Randburg, all of South Africa

[73] Assignee: Invention Factory (Proprietary) Limited, Transvaal, South Africa

[21] Appl. No.: 493,330

[22] Filed: Mar. 14, 1990

[30] Foreign Application Priority Data

Mar. 14, 1989 [ZA] South Africa ................. 89/1905

[51] Int. Cl.⁵ .............................................. G01S 3/02
[52] U.S. Cl. .................................... 342/451; 364/449; 340/995
[58] Field of Search ................ 342/452, 451; 364/449, 364/424.01; 340/995

[56] References Cited

U.S. PATENT DOCUMENTS 4,053,893 10/1977 Boyer .
4,757,455 7/1988 Tsunoda et al. .................. 364/449
4,862,374 8/1989 Ziemann ........................... 364/449
4,890,104 12/1989 Takanabe et al. ................ 340/995

Primary Examiner—Theodore M. Blum
Attorney, Agent, or Firm—Ladas & Parry

[57] ABSTRACT

A navigational aid comprises a housing with a flat, transparent liquid crystal display. The display is flat and flush with the bottom of the housing, to allow the aid to be placed flat on a map or chart. The aid is microprocessor controlled and accepts plug in memory modules, which contain information relating to an area through which a craft, for example, an aircraft, is to be navigated. The display generates cursors which can be superimposed on the map. The aid can display graphically the progress of the craft, superimposed on the map, on the basis of input data supplied by the user. Alternatively, the cursors can be moved to measure the distance beteen points on the map.

11 Claims, 6 Drawing Sheets

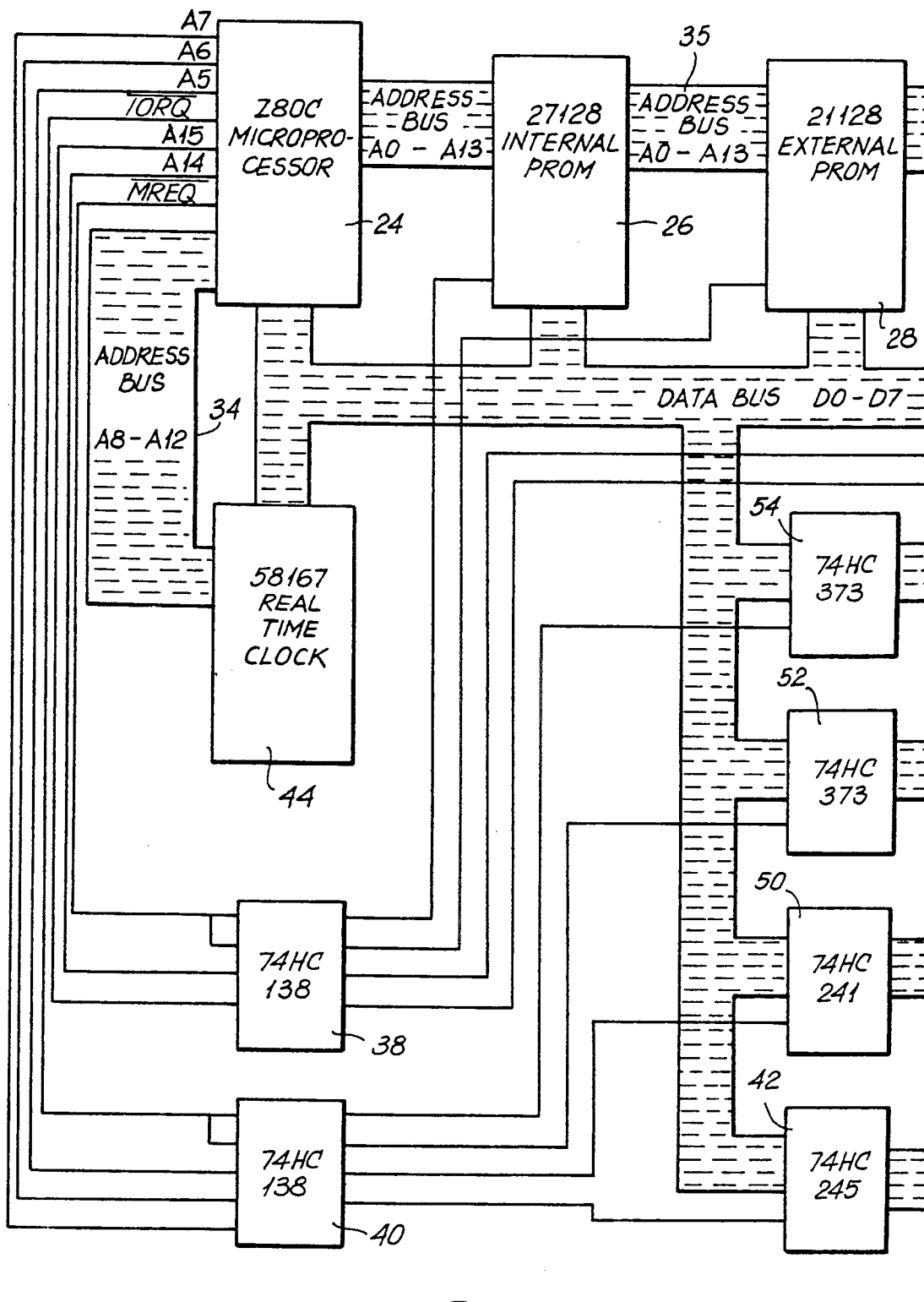
FIG. 2 (1)

NAVIGATIONAL AID

BACKGROUND OF THE INVENTION

This invention relates to a navigational aid which can be used, for example, to assist in the navigation of craft such as boats or aircraft.

Navigation of boats and aircraft is usually accomplished with the aid of maps or charts, together with instruments which may include rules, compasses and calculators. Navigation with such instruments requires a reasonable degree of skill and errors are easily made. If it is required to calculate the position of the craft accurately, taking into account, for example, the effect of wind, altitude, temperature, pressure and effects such as the "chord defect", the calculations may become highly complicated and laborious, with an increased possibility of error.

One device which has been proposed in an attempt to overcome the chord defect, which arises due to the fact that an aircraft follows a curved path relative to the surface of the earth, whereas the distance between points on a map is measured on a flat surface, is described in U.S. Pat. No. 4,555,852 to Brazel. This patent describes a hand-held compass which has legs which are interconnected by a mechanism which compensates for the chord defect. This device does not, however, address the other problems referred to above.

SUMMARY OF THE INVENTION

According to the invention a navigational aid comprises:
  display means defining a transparent zone and adapted to display at least one symbol at a variable position in the transparent zone in response to display control signals;
  processor means adapted to generate display control signals in response to at least one input signal; and
  input means operable by a user of the aid to generate input signals to which the processor means is responsive,
the processor means being further adapted to relate at least one navigational parameter of a craft to the position of the at least one symbol in the transparent zone of the display.

The transparent zone of the display means preferably defines at least one substantially flat surface which can be placed on a map or chart.

Typically, the display means comprises a multi-pixel liquid crystal display element, and the input means typically comprises a keyboard including cursor control keys and keys for entering numerical data.

DESCRIPTION OF AN EMBODIMENT

Figure 1:
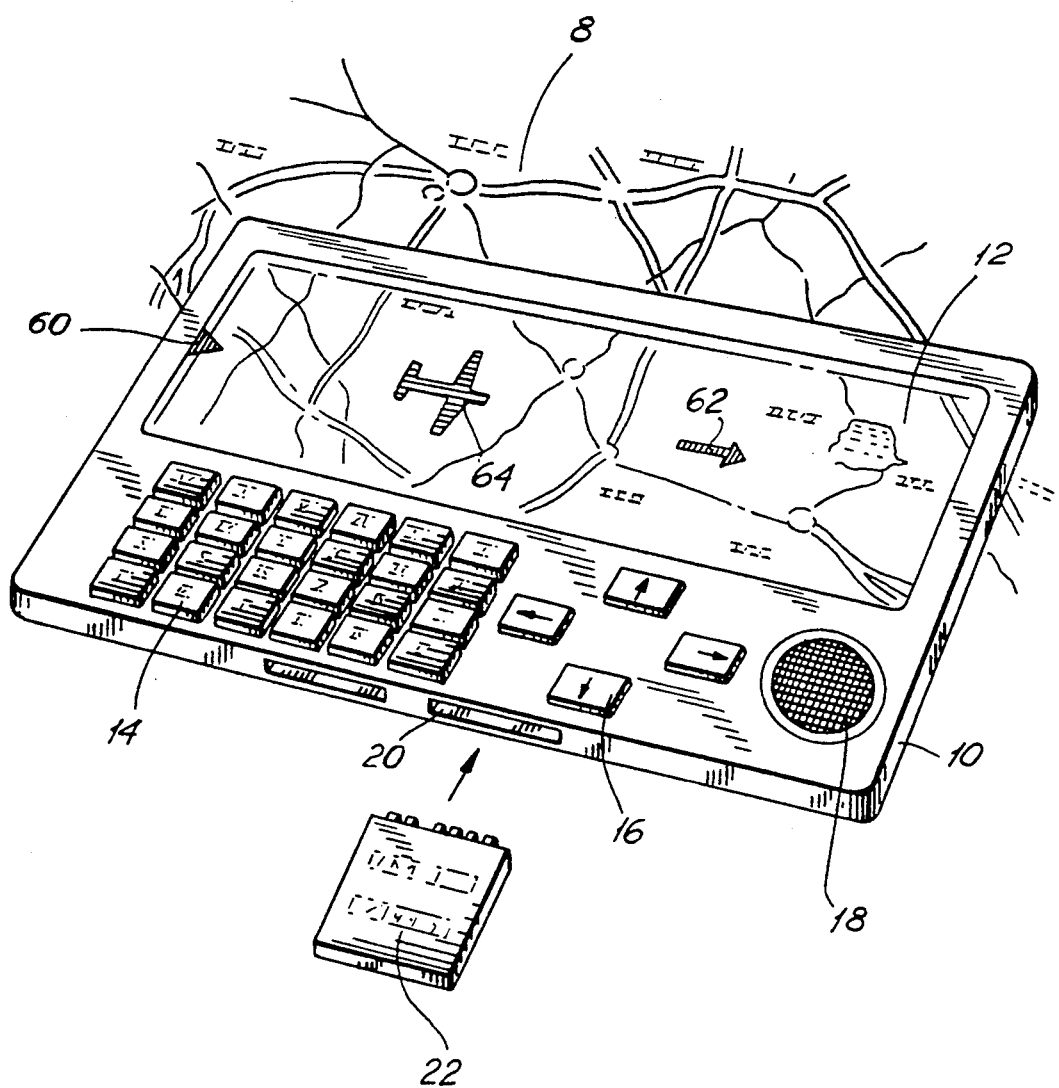
FIG. 1 is a pictorial view of a navigational aid according to the invention.

The navigational aid illustrated in FIG. 1 comprises a housing 10 which is moulded from a tough plastics material. The housing 10 is rectangular in shape and resembles, to some extent, a conventional pocket calculator. The upper half of the navigational aid is taken up by a large liquid crystal display (LCD) 12, which is capable of generating several lines of alphanumeric characters, at least, and which can be controlled to produce a graphic display.

The LCD 12 is transparent and is sandwiched between protective glass sheets which are flush with the top and bottom of the housing 10. Both the bottom glass protective sheet and the bottom of the housing 10 are flat, allowing the aid to be placed flat on a map or chart 8. Thus, characters or symbols displayed on the LCD 12 will be superimposed on the map or chart, with a very small clearance (of the order of one or two millimetres) between them. The small clearance reduces parallax errors in aligning symbols displayed by the LCD 12 with symbols on the map or chart.

The lower part of the housing 10 is taken up by an alphanumeric keyboard 14 which includes a numeric keypad, alphabetical keys, and special purpose keys, including cursor control keys 16. The housing 10 also supports a small loudspeaker or piezo-electric buzzer 18. The housing also defines two ports 20 which can receive removable memory modules 22 containing navigational information relating to a particular area, or other specialized data.

The navigational aid is battery powered and is controlled by a microprocessor running under the control of a stored program, as described in more detail below.

Figure 2:
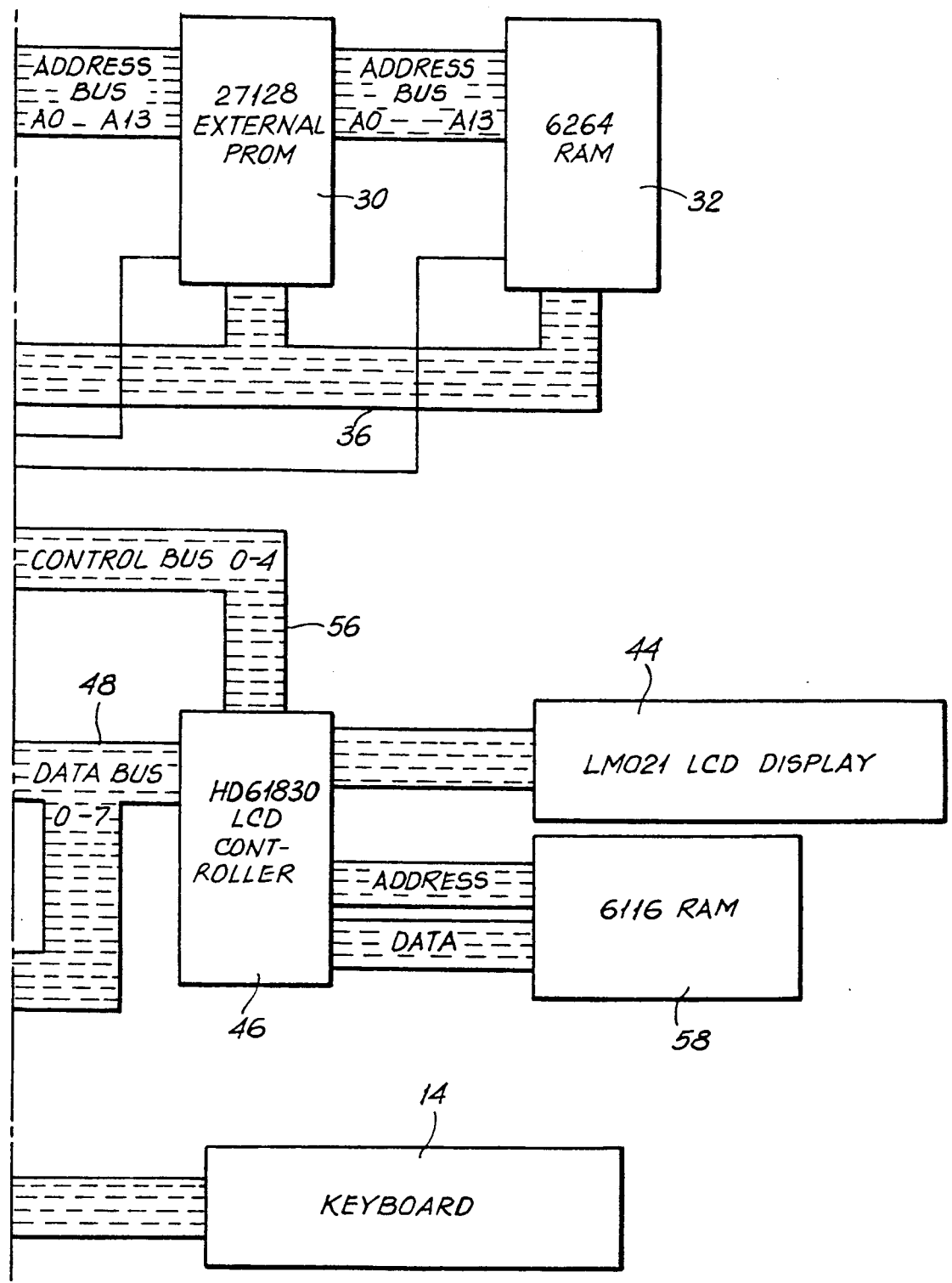
FIG. 2 is a schematic block diagram of the electronic circuitry of a navigational aid according to the invention.

FIG. 2 illustrates the electrical circuitry of the navigational aid. The prototype device employed a Z80C microprocessor 24, using a 4 MHz crystal and oscillator as a clock, three type 27128 programmable read-only memories (PROM's) 26, 28 and 30, and a type 6264 random accessd memory (RAM) 32. The PROM's 26, 28 and 30 are 16 kilobyte×8 devices, while the RAM 32 is an 8 kilobyte×8 device. The microprocessor, the PROM's and the RAM are connected by a 16 bit address bus 34 and an 8 bit data bus 36. The two sockets 20 at the front of the navigational aid housing enable two external PROM's 28 and 30, which serve as supplementary memory modules, to be added to the circuit Two 3-line to 8-line type 74HC138 decoders 38 and 40 are used for port addressing in the circuit. The decoder 38 controls memory port selection, while the decoder 40 controls I/O (input/output) port selection. The memory port selection decoder 38 has its chip enable signal connected to MREQ of the microprocessor 24, and two of its select lines are connected to A14 and A15 of the address bus 34. With MREQ active, one of four of the decoder output lines will be active, depending on the state of A14 and A15, thereby selecting one of the four memory chips 26 to 32. Each of the four output lines is connected to the chip select input of a respective memory chip.

| 0000-3FFF | Internal PROM 26 |
| 4000-7FFF | 1st external PROM 28 |
| 8000-BFFF | 2nd external PROM 30 |
| C000-FFFF | RAM 32 |

The I/O port selection chip decoder 40 has its chip enable input connected to IORQ of the microprocessor 24 and its select line are connected to A5, A6, and A7 of the address bus 34. With IORQ active, one of the eight output lines will be active, depending on the state of A5 to A7, to select the appropriate I/O device.

The I/O addresses are as follows:

| 001F | Data bit D5 | Loudspeaker |
| 001F | Data bits D0–D4 | LCD controller command register |
| 003F | | LCD controller output register |
| 005F | | LCD controller input register |
| 007F | | Keyboard input register |
| 009F | | Real time clock input/output register |

The keyboard 14 is connected to the circuit using 9 lines, comprising 1 ground line and 8 data bits. The 8 data lines are all connected to +5 V via pull-up resisters, and to a 74HC245 octal Tri-state (Trade Mark of National Semiconductor Corporation) line receiver 42 with inverted outputs. The keyboard uses double pole keys, so that each key is capable of connecting two of the data lines to ground, so generating a 2-of-8 code (28 possible combinations) whereby 2 of the data lines are low (0) and 6 are high (1). As the octal receiver 42 inverts the data, this is reversed to 2 high bits and 6 low bits.

The output side of the octal receiver 42 is directly connected to the data bus 36 and, being a Tri-state device, will only transfer data to the bus when enabled. The keyboard is read by executing a Z80 IN command to port 7F. This will give a scan code, indicating the key being depressed. Depending on the keyboard subroutine in control at the time, this scan code can be translated into either an ASCII value, a BCD value, a numeric value, or a control code, using look-up tables. The keyboard is read every 10th of a second during interrupt processing.

The circuitry of the navigational aid includes a real-time clock 44. In the prototype, a National Semiconductor type NM58167A chip was used. The chip data lines D0 to D7 are connected to the data bus 36, and the address input A0 to A4 are connected to lines A8 to A12 of the address bus 34. The RD and WR pins are connected to the corresponding RD and WR pins on the microprocessor 24 and the CS (chip select) input is connected to the I/O port addressing decoder 40. The interrupt output signal of the clock chip is connected to the INT input of the microprocessor. The clock chip is connected to a 32 768 Hz crystal oscillator.

When power is applied to the circuit, the real time clock chip 44 is programmed to activate the interrupt line of the microprocessor at 1/10th second intervals. In addition, the Z80 control programme will request user input of Universal Time via the keyboard, in the format HH MM SS. As each digit is received from the keyboard, it is translated into a binary coded decimal (BCD) value, and sent to the appropriate register of the real time clock 44 using the address lines A8 to A12 to select the register.

Once the correct time has been input to the real time clock, the clock can be started by pressing the "start" key on the keyboard, at which point the control program will send a start command to the appropriate register.

The circuit includes an LM021 liquid crystal display (LCD) 44 which is controlled by a type HD61830 LCD controller chip 46. The display controller 46 is not connected directly to either the data or address busses 34 and 36, but effectively operates as a separate system with 3 busses, a memory data bus, a memory address bus and an I/O data bus. The memory data and memory address buses are connected to a 6116 2kb×8 RAM for storage of screen data while the I/O data bus 48 is connected to a 74HO241 octal line driver 50 for transfer of data from the LCD controller 46 to the data bus 36, and to a 74HC373 octal latch 52 for data input from the data bus 36 to the LCD controller 46. A second 74HC373 octal latch 54 is connected between the data bus 36 and the control lines 56 of the LCD controller 46.

The display is controlled by writing data to the instruction register of the LCD controller 46 and its 13 data registers, which will select how the screen is controlled and the mode of display (i.e. graphics or characters, cursor position and type, etc.). The data to be displayed is written to the 6116 RAM 58 which is connected to the LCD controller 46.

To write data to the LCD controller 46 from the microprocessor 24, the appropriate data is loaded into the octal latch 52 data register. Using the same sequences of instructions, but selecting a different address to select the command register of the LCD controller, the appropriate control lines of the LCD controller can be toggled. To read data from the LCD controller to the microprocessor, the appropriate register in the LCD controller is selected, and its control line E is set to 1. This will put the selected data on the input/output data bus of the LCD controller, which can then be read by the microprocessor 24. The LCD controller 46 is controlled by putting appropriate data on the I/O data bus 48 and toggling the control lines in the required sequence. Two subroutines are used to toggle the control lines, both of which write 8 bytes successively to the command register of the octal latch 52. Before executing the subroutines, the required data must be loaded into the data register of the octal latch 52. A third subroutine is used to read the busy flag.

The LCD display 44 is a 480×24 pixel graphic display screen, divided into two halves, left and right. The display can display 3 lines of sixty alphanumeric characters, or can be used entirely as a graphic display. The display has a total of 11 520 pixels, with a 8 pixels corresponding to each character stored in RAM. Thus, pixels 0 to 7 will be found in RAM address 0, pixels 8 to 15 will be found in RAM address 1, and so on. The RAM address can be calculated by dividing the pixel address by 8, the remainder being used as the bit number within the byte.

In summary, the microprocessor 24 runs the main control programme which is stored in the first PROM 26, and controls the operation of the other devices. The PROM 26, which is built into the device, holds the main control programme. The optional, external PROM's 28 and 30 can be plugged into the device and contain data bases of relevant information such as details of airports, harbours, beacons, radio navigation aids, aircraft types etc. The RAM 32 is utilized as a general working storage area. In addition, a user of the navigational aid may manually enter database information, such as information relevant to a journey, including wind speed, time of departure, air speed etc. which is retained in the RAM. The real time clock 44 is used as a chronometer which is set to Universal Time. In addition, the real time clock provides interrupt signals to the microprocessor 24 to enable the microprocessor to maintain clocks for local time, stop watches, travel time etc. The LCD 44 is used to generate both graphical and alphanumeric data which can be superimposed, in use, on a map or chart, as described below. The keyboard 14 allows data input to the navigational aid and allows cursors on the display 44 to be controlled. The speaker or buzzer 18 draws attention to errors, or draws the operator's attention when user input is required.

The described aid is preferably battery powdered, with a power supply input socket (not shown) to allow mains power to be used in certain circumstances.

In order to provide a useful navigational aid, a number of functions are provided. These include a stop watch, chronometer, mathematical calculator, navigational calculator, and a dead reckoning calculator with a graphic representation. The first mentioned three functions are relatively conventional, and are not described in detail. However, the unique design of the described navigational aid allows the latter two functions to be provided in a highly useful way. In particular, the last-mentioned facility involves the entering of speed and direction information, as well as external factors duch as tides or winds, atmospheric conditions etc., and calculating and representing graphically, on a continuous basis, the distance travelled by a craft as a function of time.

In order to perform such calculations, a library of mathematic subroutines specific to navigational requirements are provided. These include vector routines which enable graphical representations of calculations involving speed and direction information to be generated. International Standard Atmosphere (ISA) routines, which are based on stored tables of temperature, pressure and density at 100 foot (30 m) intervals, are included. Look-up routines are used to calculate ISA values, using interpolation for intermediate values. Further subroutines include clock routines, which allow the navigational aid to function as a local time clock, a stop watch, a travel time indicator, or an interval timer. Sound routines are also included, which control the operation of the loudspeaker or buzzer 18 by the toggling of a single bit, for example, to output error warnings, operator attention signals, or morse code signals which are used for navigational information (for example, beacon or lighthouse signals). Keyboard routines and display routines are also provided. The display routines perform three major functions: firstly alphanumeric data is displayed, to provide the results of calculations, the output of clocks and stop watches, and navigational information. Secondly, by setting and clearing individual pixels on the screen, graphical representations of navigational data are displayed, such as a flight plan drawn to a pre-selected scale and including navigationl information such as beacons, wave points, VOR's, airports, harbours, etc., as well as the current positon of a craft relative to the start of a journey, based on travel time and speed. Thirdly, by allowing the distance between two cursors or a cursor and a reference point on the screen to be adjusted, the device can be used as a measuring and scale conversion instrument.

Database routines are also provide, to manipulate the stored data (typically, in the external PROM's 28 and 30). These routines enable the indexing and access of the data on a table basis. A simple bubble sort routine is also including for user inputted data. The tables consist of fixed length records containing information headings such as Latitude, Longitude, Name, Height, Frequency, etc.

Two highly significant routines provided by the navigational aid are preferred to as Planner and Navigate Routines. The Planner Routines are used to capture data for a navigational plan. All data capture is based on a user-friendly, menu-driven system, whereby the operator of the navigational aid is promoted for the appropriate input. The Planner Routines include a Route and an Environment stage.

Route Stage

In this stage, the route to be followed to by a craft is drawn up. The route comprises start and end points and intermediate check points, waypoints, beacons, radio aids and the like. The type of point must be specified, for example an airport, VOR, beacon etc. All points can be entered in one of the following formats:
 a) Distance and bearing from the start; or
 b) Latitude and longitude; or
 c) Mnemonics which will extract information for the database With each point there will be associated data. Using data entry methods (a) or (b), the associated data will also need to be captured. Using method (c), the appropriate data will be extracted from the database. The data associated with the points entered will depend on the type of point, but typically can include the following:
Type of Point
Latitude and longitude, or distance from start
Radio frequency
Morse code signal
Height above seal level
VOR frequency
New height or heading
General comments (phone numbers, names)
From these, the control programme calculates the distance and bearing of each point from the start point and builds up a sorted table, based on the distance from the start, of all the points.

Environment Stage

This section is used to capture data applicable during execution of the planned route. Typically, this would consist of:
Magnetic variation
Wind, tide or current speed and direction
Barometric pressure
Temperature
Indicated speed
Altitude
From this data and the data captured in the Route stage, the control prgramme can then calculate corrected data. The corrected data includes actual ground speed and true heading, and, depending on the application, can also include true air speed and height, compass heading, drift, etc.

Figure 3:
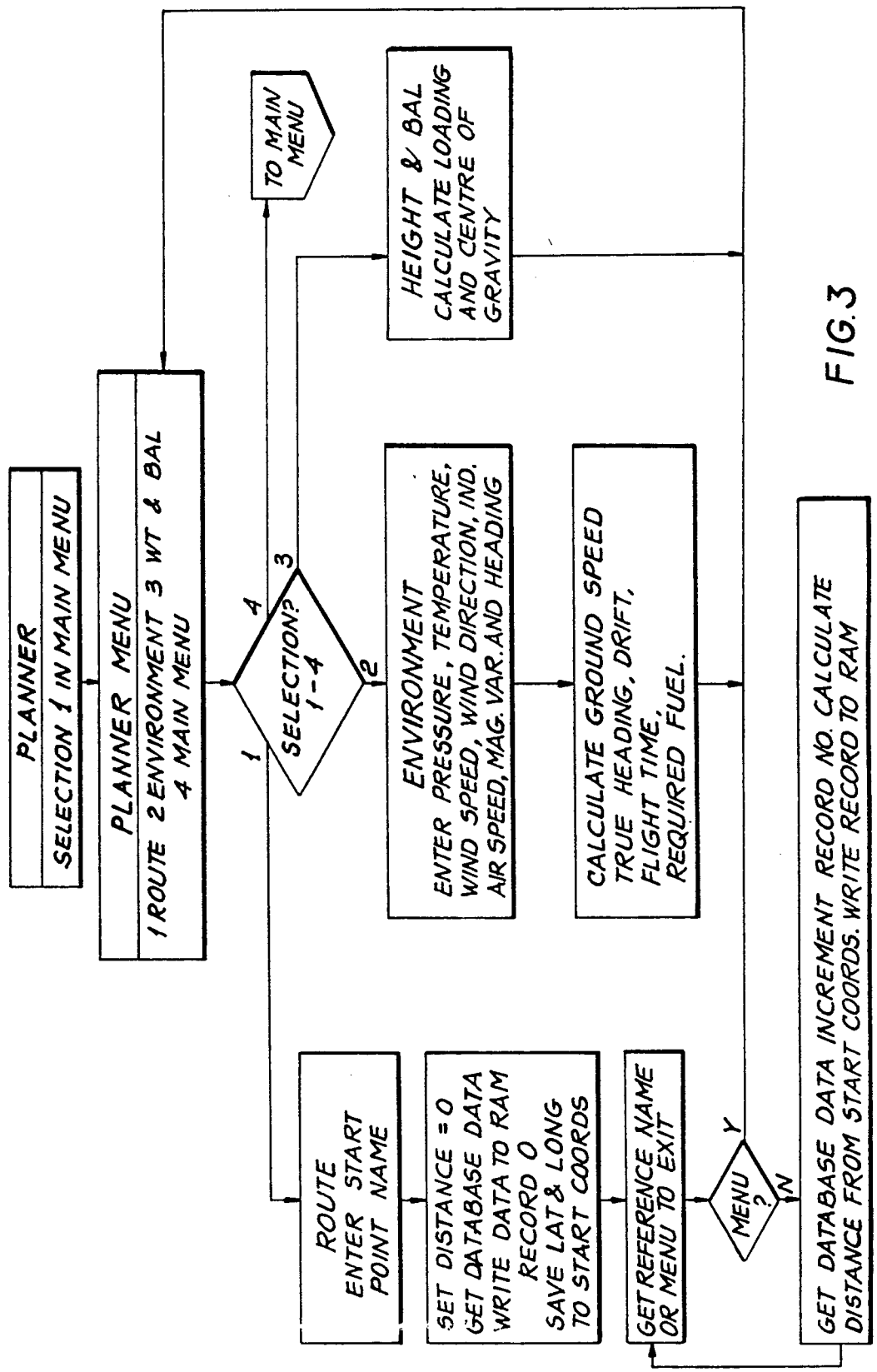
FIGS. 3 and 4 are flow charts of two modes of operation of the navigational aid.

The flow chart of FIG. 3 illustrates the operation of the Planner Routines.

The second major set of routines are named Navigate Routines, which involve graphical representation of data. Both these routines involve the use of standard graphic symbols on the display 12 of the navigational aid. The standard symbols include a "Start" pointer 60 in the form of a triangle, an "End" pointer in the form of an arrow 62 and a "Current Position" pointer 64 which represents the craft being navigated (for example, an aircraft, yacht, car etc.). The Navigate Routines have two main purposes, namely, to measure or display a scaled distance, and secondly, to provide a real time, dynamic display of a voyage.

The use of the navigational aid as a measuring device will first be described. By utilising the cursor control keys 16 on the keyboard, the start and end pointers 60 and 62 can be moved freely around the screen 12. From the known spacing between pixels on the screen (typically) between 0,35 and 0,5 mm) and from the position of the pointers on the screen, a calculation of the distance between the pointers, accurate to within 0,5 mm, can be made using simple mathematical routines. By selecting the scale of the distance being measured (typically, corresponding to the scale of a map over which the navigational aid is placed) and by selecting the unit in which the output is required, an actual distance can be calculated and displayed alphanumerically.

EXAMPLE

| | |
|---|---|
| Distance beetween pixels | 0.48 mm |
| Scale of map or chart | 1:250 000 |
| Required unit | Nautical miles |
| By moving the pointers, the required positions are found to be 383 pixels apart. | |
| Therefore, distance between pointers is | 383 × 0.48 = 183.8 mm |
| Using 1 inch = 25.4 mm | = 87.84 ÷ 25.4 = 7.24 in. |
| Using scale 1:250 000 | = 1 810 000 in. |
| Using 1 nautical mile = 6080 ft = 72960 in. | = 1 810 000 ÷ 72960 = 24.8 n. miles |

Conversely, by specifiying a required distance, the unit of the distance and the scale, the navigational aid can calculate and the corresponding spacing of the two cursors 60 and 62 and display them appropriately.

EXAMPLE

| | |
|---|---|
| Distance between pixels | 0.48 mm |
| Scale | 1:500 000 |
| Units | Statute miles |
| Required distance | 32 miles |
| Using 1 statute mile = 5280 ft = 63360 in. | = 32 × 63360 = 2027520 in. |
| Using 1 inch = 25.4 mm | = 2027520 × 25.4 = 51499008 mm |
| Using scale 1:500 000 | = 102.99 mm |
| Using pixel spacing 0.48 mm | = 102.99 ÷ 0.48 = 215 pixels |

The two cursors would therefore be displayed 215 pixels apart, which can then be transposed to a map or chart over which the aid is placed.

Using the data captured using the Planner Routines, a graphic representation of a planned route can be displayed to scale on the display 12, utilizing the same routines as the measuring device described above. Symbols are also displayed, at appropriate positions, indicating the various types of reference points along the route. By moving the end or intermediate pointers 62, 64 onto any such symbol, the data associated with that symbol/reference point is alphanumerically displayed along the bottom of the screen.

While a trip is in progress, the current position relative to the planned route can continuously be updated and displayed by using the real time clock as a stop watch which is started at the commencement of the journey, and using the actual speed and heading as calculated in the environment stage of the planner Routine. On approaching or passing any of the reference positions, an alarm will sound via the speaker/buzzer 18, and the appropriate data for that reference position is displayed alphanumerically. Any morse code signal associated with that reference point is also generated, using the sound routine.

Figure 4:
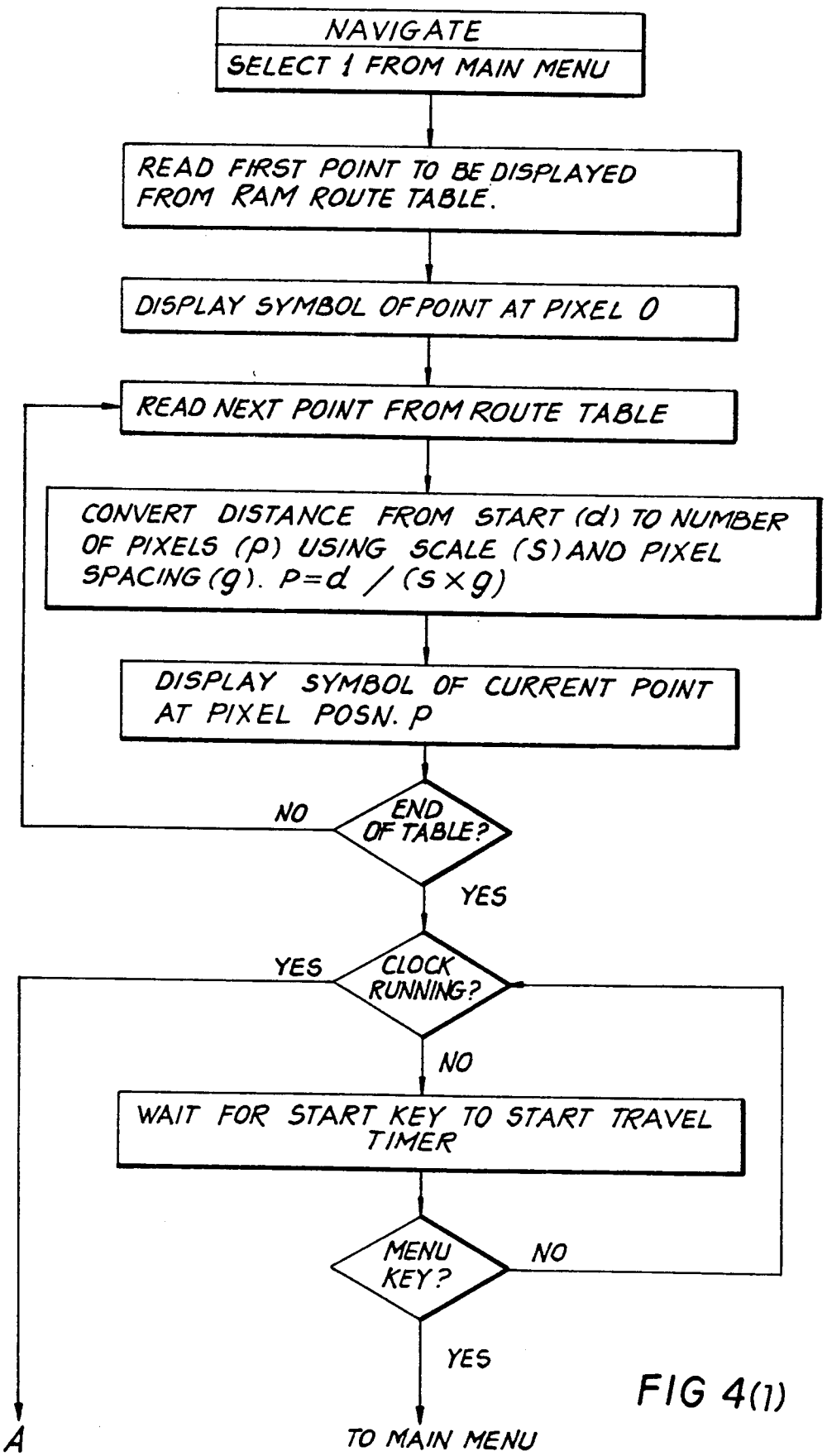
Figure 4:
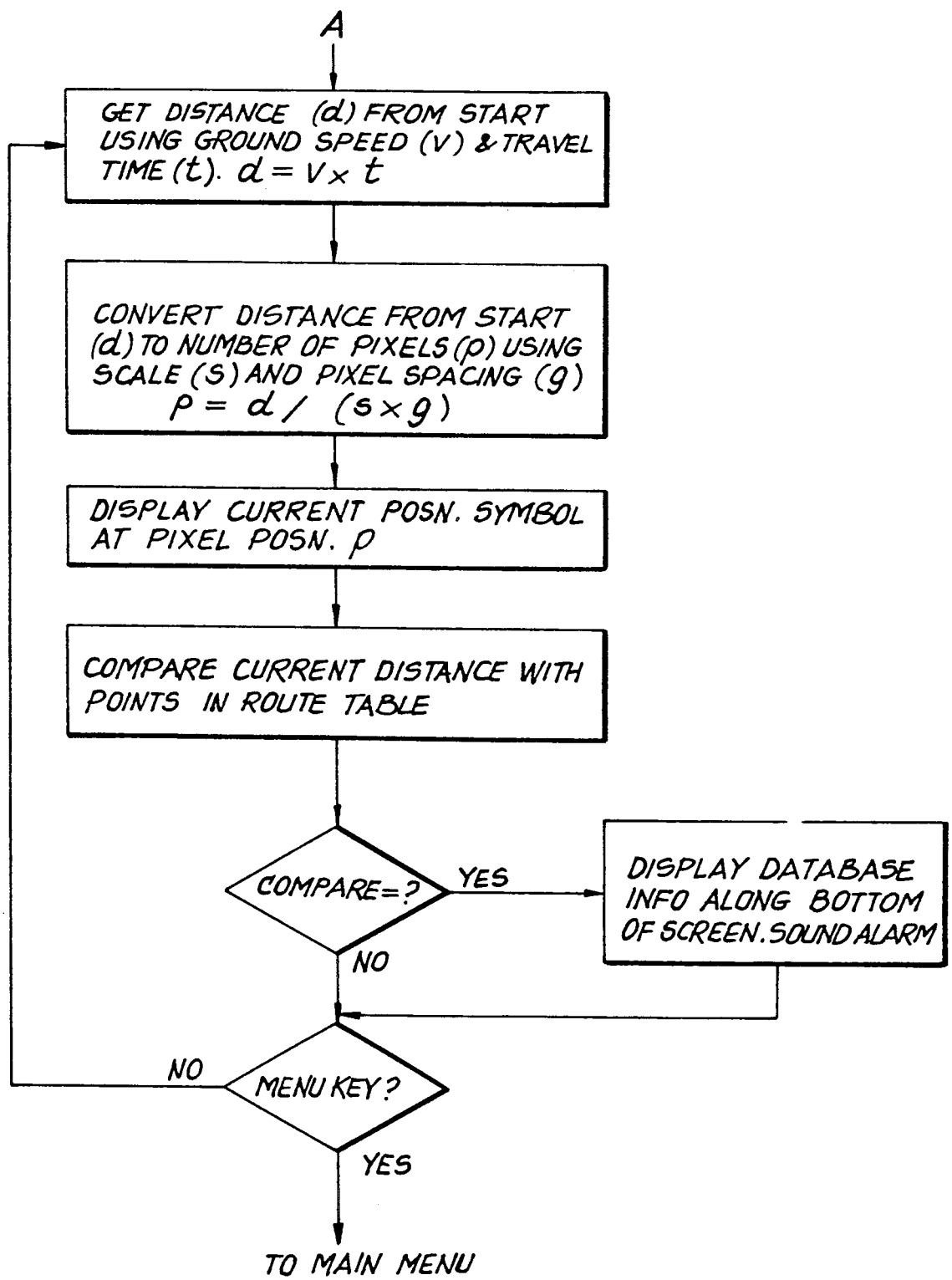

The flow chart of FIG. 4 illustrates the operation of the Navigate routines.

We claim:

1. A navigational aid comprising display means defining a display zone and adapated to display at least one symbol at a variable position in the display zone in reponse to control signals, manual input means comprising a keyboard operable by a user of the aid to generate input signals, and processor means adapted to accept input signals from the input means corresponding to the scale of a map, the speed of a craft, and a time value, to calculate the position of the craft relative to a reference point in terms of the input signals, and to generate display control signals representative of the position of the craft relative to the reference point so that a graphic display of the position of the craft is generated in the display zone, the processor means further being adapted to calculate the distance between a cursor and a reference point and to generate display control signals representative of the distance between two points on the map corresponding to the positions of the cursor and the reference point.

2. A navigational aid to claim 1 wherein the display zone of the display means in transparent and defines at least one substantially flat surface which can be placed on a map or chart.

3. A navigational aid according to claim 2 wherein the display means comprises a multi-pixel liquid crystal display element.

4. A navigational aid according to claim 1 wherein the input means comprises a keyboard including cursor control keys and keys for entering numerical data.

5. A navigational aid according to claim 4 wherein the cursor is movable at will on the display in response to operation of the cursor control keys.

6. A navigational aid according to claim 1 wherein the display means is adapted to display the distance between the two points on the map in an alphanumeric format in response to the display control signals.

7. A navigational aid according to claim 1 wherein the display control signals cause a graphic symbol representative of the craft to be generated on the display means.

8. A navigational aid according to claim 1 wherein the processor means is adapted to accept at least one further input signal and to calculate the position of the craft in terms thereof, the at least one further input signal being selected from the group comprising a bearing of the craft, a wind speed and direction, a magnetic variation, a barometric pressure, a temperature and an altitude of the craft.

9. A navigational aid according to claim 1 wherein the processor means includes clock means and is adapted to calculate the position of the craft as a function of time, and to generate display control signals representative of the position of the craft relative to the reference point with respect to time.

10. A navigational aid according to claim 1 wherein the processor means includes memory means adapted to store data relating to a predetermined area through which the craft is to travel.

11. A navigational aid according to claim 10 wherein the processor means is adapted to retrieve data from the memory means and to generate data display signals corresponding to the retrieved data when the graphic symbol representative of the craft on the display approaches a further displayed symbol, to which the retrieved data corresponds.

* * * * *